H. S. JEWELL.
Grain-Separators.
No. 149,661. Patented April 14, 1874.
2 Sheets--Sheet 1.
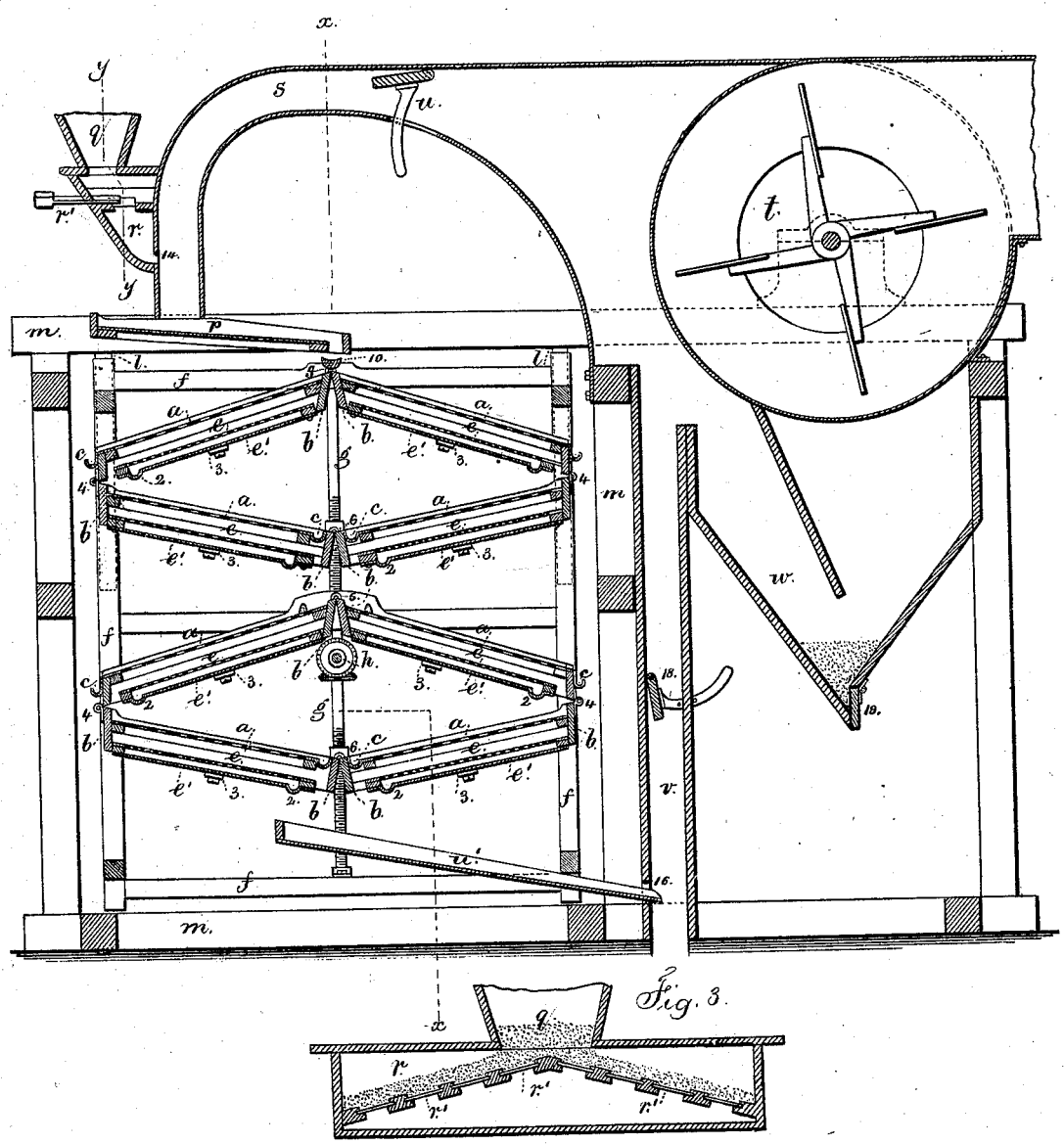
Witnesses.
Chas H Smith
Geo S Pinckney
Inventor.
Herbert S Jewell
per L. W. Serrell
atty 2 Sheets--Sheet 2.
H. S. JEWELL.
Grain-Separators.
No. 149,661. Patented April 14, 1874.
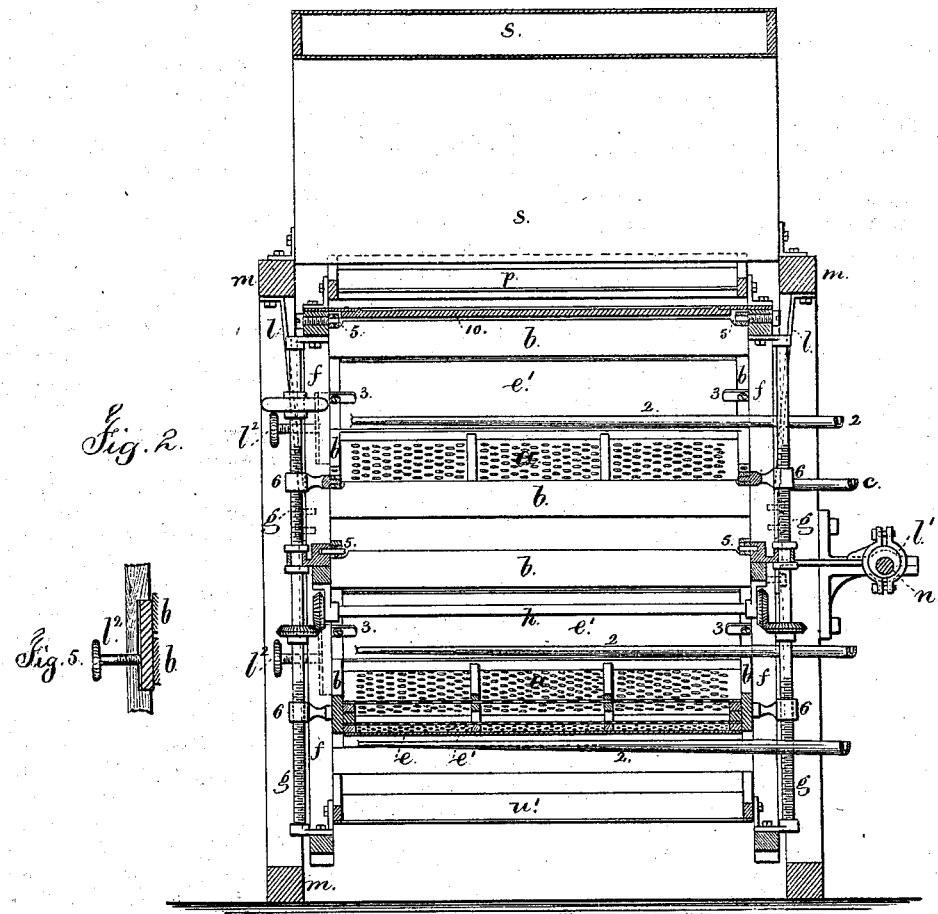
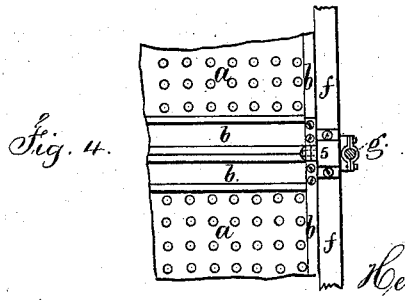
Witnesses.
Chas H Smith
Geo. T. Pinckney
Inventor,
Herbert S. Jewell
per L. W. Serrell
Atty.

UNITED STATES PATENT OFFICE.

HERBERT S. JEWELL, OF BROOKLYN, NEW YORK.

IMPROVEMENT IN GRAIN-SEPARATORS.

Specification forming part of Letters Patent No. 149,661, dated April 14, 1874; application filed February 12, 1874.

*To all whom it may concern:*

Be it known that I, HERBERT S. JEWELL, of Brooklyn, in the county of Kings and State of New York, have invented an Improvement in Grain-Separators, of which the following is a specification:

The grain is supplied with uniformity by a hopper with adjustable slides, and passes by a mouth upon an equalizing-plate, and thence to separating-sieves. These sieves are hinged in pairs, and the angle of inclination is varied by adjusting the edge of one sieve in each pair. Oats are passed off by transverse troughs. Cockle and small seeds pass through screens, the meshes of which are too small for the wheat, and these seeds are similarly delivered by lateral spouts. The cockle-sieves are removable for cleaning. The grain, after passing over a series of sieves inclined in alternate opposite directions, is delivered into a blast-trunk, and the light grain passes up and the heavy grain falls away ready for grinding. The blast is produced by a blower that also carries away dust from the grain as it passes into the machine.

In the drawing, Figure 1 is a longitudinal section of the separator. Fig. 2 is a section of the sieves at the line $x$ $x$. Fig. 3 is a section of the feeding-hopper at the line $y$ $y$, and Fig. 4 is a plan view of a portion of two of the sieves.

Each of the sieves made use of in this machine consists of a perforated plate, $a$, set in a frame, $b$, the openings of which are sufficient to allow the wheat to pass through, but the oats pass off by the lateral trough and delivery-spout $c$. The wheat falls upon the cockle-sieve $e$, the perforations in which are too small for the wheat; the grain runs off the edge of the sieve and passes to the next sieve $a$, as hereafter detailed; but the cockle and small seeds that go through the sieve $e$ slide upon the bottom plate $e'$ to the lateral delivery trough or mouth 2. The sieve $e$ and plate $e'$ are kept apart by intermediate strips at the edges, and are fastened to each other, and are of a size to fit into the frames $b$, and they are secured by the buttons 3, so that they can be removed from time to time for cleaning. I have shown eight sets of sieves, each made in the manner before described, and the frames $b$ $b$ are hinged together at 4 in pairs, and the sieves and frames are positioned so as to stand at alternate opposite inclinations. The sieve-frames $b$ are also connected in pairs at 5 to the cross-bars of the frame $f$, and the pairs of sieves are connected to the nuts 6, through which pass the screw-rods $g$ that are revolved by hand to raise or lower the nuts 6, and thereby raise or lower the lower edges of the pairs of sieves and alter the inclinations of the respective sieves to cause them to operate the most efficiently in separating. The cross-shaft $h$ and miter-gearing serve to revolve the screws $g$ $g$ at a uniform speed when either one is turned. By this arrangement of alternate sieves a very large extent of surface is obtained in a small space, and the parts are light and durable. The frame $f$ is suspended by spring-straps $l$ from the frame $m$ of the machine, so that it is free to be vibrated by the eccentrics, cams, or knuckles $l^1$ on the shaft $n$, driven by competent power. The screws $l^2$ (see Figs. 2 and 5) are applied at the ends of the sieve-frames, and serve to press against them plates or gibs to steady and clamp the sieve-frames within the frame $f$, so that the said sieves will be held firmly in the frame $f$ and be vibrated with that frame. These screws should be slackened when the sieves are being adjusted by the screws $g$. The grain is delivered upon the inclined plate $p$, and runs from its lower edge upon the distributer-trough 10 above the apex of the screens, so as to scatter equally in both directions upon the upper-inclined screens. The grain is introduced by a chute $q$, into the hopper $r$, and it runs down the inclined surface at the bottom of the hopper, as seen in Fig. 3, so as to spread the entire width of the hopper. If the bottom of the hopper were flat the grain would not pass to the ends of the hopper as reliably as when the bottom is inclined. In this inclined bottom there are openings with regulating-slides $r'$, that determine the amount of grain passing, so as to render the supply as uniform as possible across the hopper. The grain passes out of the mouth 14 upon the incline $p$, and in so doing it is exposed to an upward current of air in the trunk $s$ that removes dust and light particles. The current in $s$ is induced by a fan-blower, $t$, and the damper $u$ regulates the quantity of air passing through the trunk $s$ and the velocity of the current. The grain, as delivered from the bottom-inclined sieves $e$, passes upon the inclined plate $u$, and runs through the mouth 16 in the blast-trunk $v$, the current of air in which is induced by the exhaust-fan $t$, and the force is regulated by the damper 18. The current is sufficiently powerful to draw up any light and imperfect grains of wheat and deposit them in the receptacle $w$, while the perfect wheat passes down the trunk $v$. The damper 19 at the bottom of the hopper $w$ is pressed to its seat by the atmospheric pressure, but yields to the weight of grain sufficiently to allow the same to pass off as it accumulates.

I claim as my invention—

1. The sieves hinged together in pairs and inclined in alternate opposite directions, in combination with adjusting-screws or their equivalents, to regulate the angle of inclination, substantially as set forth.

2. A series of sieves inclined in alternate opposite directions, and provided with closed bottom plates, and hinged within a frame that is vibrated, in combination with adjusting-screws or their equivalents, to regulate the inclination of the sieves, substantially as set forth.

3. Two or more pairs of grain-sieves hinged together within a vibrating frame and inclined in alternate opposite directions, the upper pair being hinged to the vibrating frame, in combination with adjusting-screws or their equivalents, applied where the lower pair are hinged together, and incline $p$ for distributing the grain to the respective sieves, substantially as set forth.

4. The cockle-sieve $e$ and plate $e'$, connected together and provided with the chute or spout 2, in combination with the frame $b$, to which the sieve and plate are removably applied below the sieve $a$, as and for the purposes set forth.

5. A series of inclined sieves hinged within the frame $f$ and adjustable substantially as set forth, in combination with the screws $l^2$ and gibs, for the purposes and substantially as specified.

6. The distributing-hopper $r$, with an inclined bottom and slides $r'$, in combination with the blast-trunk $s$, inclined plate $p$, and sieves, substantially as set forth.

7. A range of compound sieves inclined in alternate opposite directions, there being a cockle-sieve applied below each oat-sieve to form such compound sieve, substantially as set forth.

Signed by me this 9th day of February, A. D. 1874.

HERBERT S. JEWELL.

Witnesses:
GEO. T. PINCKNEY,
CHAS. H. SMITH.